United States Patent [19]

Ashe et al.

[11] Patent Number: 5,652,876

[45] Date of Patent: Jul. 29, 1997

[54] METHOD AND APPARATUS FOR LAUNCHING FILES CREATED BY NON-RESIDENT APPLICATION PROGRAMS

[75] Inventors: Dylan B. Ashe, Sunnyvale; Nick G. Kledzik, Cupertino, both of Calif.

[73] Assignee: Apple Computer, Inc., Cupertino, Calif.

[21] Appl. No.: 718,119

[22] Filed: Sep. 18, 1996

Related U.S. Application Data

[63] Continuation of Ser. No. 344,542, Nov. 22, 1994, abandoned, which is a continuation of Ser. No. 997,688, Dec. 28, 1992, abandoned.

[51] Int. Cl.$^6$ .................................................. G06F 9/44
[52] U.S. Cl. ....................... 395/500; 395/601; 364/283.2
[58] Field of Search ......................................... 395/500, 600

[56] References Cited

U.S. PATENT DOCUMENTS 4,686,522  8/1987  Hernandez et al. ..................... 340/709
5,065,347  11/1991  Pajak et al. .............................. 395/159

FOREIGN PATENT DOCUMENTS 0192927  9/1986  European Pat. Off. .
0408132  1/1991  European Pat. Off. .

OTHER PUBLICATIONS

Alan Simpson, "Mastering Word Perfect For Windows," selected pages, Library of Congress Card No. 91–66933, 1993.
IBM Technical Disclosure Bulletin, "Automatic Selection of a Transformation Graph Based on User Criteria", vol. 34, No. 6, Nov. 1991, Armonk, NY, pp. 157–158.
N. Ajitomi, "Design of Generalized Document Viewer Using Object Chain Representation," IEEE, Compsac 19 Conference, Sep. 11–13, 1991 Tokyo, Japan, pp. 204–211.

Primary Examiner—Krisna Lim
Attorney, Agent, or Firm—Carr DeFilippo & Ferrell

[57] ABSTRACT

A method in a computer system enables the translation and opening of a document which was created by an application program no longer resident in the computer system. The method begins by identifying the file format of the target document, Subsequently, all computer resident applications capable of opening the document are identified and translation paths from the document to the accessible application programs are calculated. Each of the available application programs and corresponding translation paths are listed in order of fidelity, with an indicia identifying the preferred path. One of the translation paths is selected and the document is translated into the acceptable format. Following translation of the program, the application is launched and the newly translated document is opened.

21 Claims, 20 Drawing Sheets

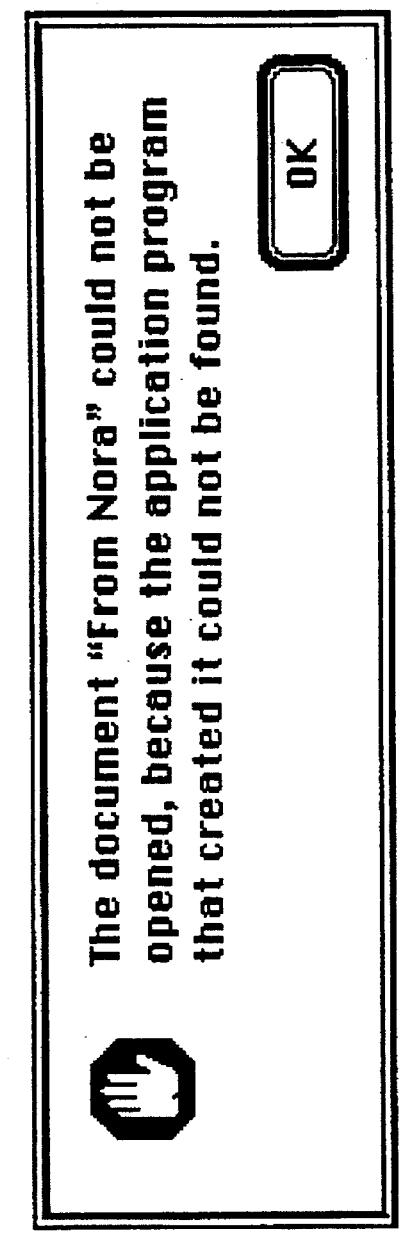
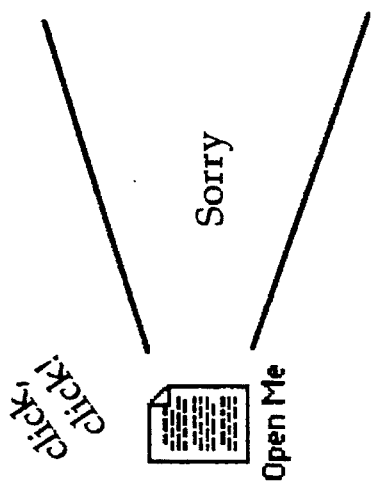
FIG. 3

400 — Without Macintosh Easy Open 410  420

| Name | Size | Kind | Label |
|---|---|---|---|
| ▢ Aquarium | 8K | After Dark document | — |
| ▢ Bob's Addresses | 8K | Microsoft Works d... | — |
| ▢ Dylan's Toolbar | 8K | Microsoft Excel do... | — |
| ▢ Files from Debi | 8K | document | — |
| ▢ Gnarly Waves | 8K | Studio/1 document | — |
| ▢ Harrington Letter | 13K | document | — |
| ▢ IBM Annual Report | 13K | document | — |
| ▢ McKenzie Budget | 8K | Wingz document | — |
| ▢ Nick's Journal | 50K | ODA document | — |
| ▢ Report from Peter | 8K | document | — |
| ▢ Study Guide | 8K | Hypercard document | — |

FIG. 4A
(Prior Art)

400 — With Macintosh Easy Open 410  440

| Name | Size | Kind | Label |
|---|---|---|---|
| ▢ Aquarium | 8K | After Dark module | — |
| ▢ Bob's Addresses | 8K | MS Works database | — |
| ▢ Dylan's Toolbar | 8K | Excel Toolbar | — |
| ▢ Files from Debi | 8K | AppleLink package | — |
| ▢ Gnarly Waves | 8K | Studio/1 graphics | — |
| ▢ Harrington Letter | 13K | WordPerfect PC 4... | — |
| ▢ IBM Annual Report | 13K | WordStar document | — |
| ▢ McKenzie Budget | 8K | Wingz spreadsheet | — |
| ▢ Nick's Journal | 50K | ODA document | — |
| ▢ Report from Peter | 8K | Stuffit archive | — |
| ▢ Study Guide | 8K | Hypercard stack | — |

FIG. 4B

Without Macintosh Easy Open

With Macintosh Easy Open

When you drag a document icon to a program icon that can open it, you'll get the Macintosh Easy Open list of choices.

Translation Dialog overview/Calculate suitable substitute applications

Translation Dialog overview/Separate paths into categories based on est.

Translation Dialog overview/Load Preferences (if any)

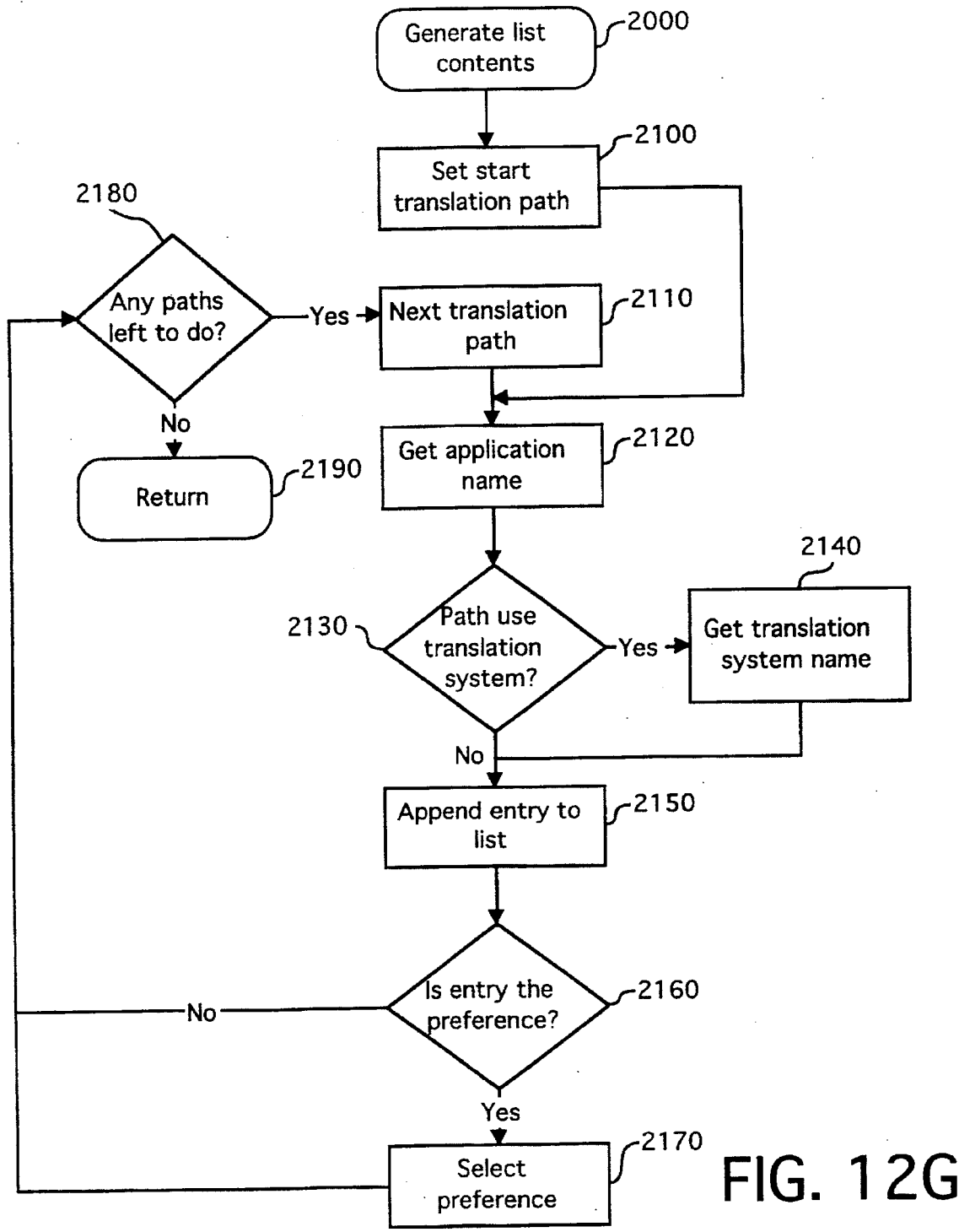

METHOD AND APPARATUS FOR LAUNCHING FILES CREATED BY NON-RESIDENT APPLICATION PROGRAMS

RELATED APPLICATIONS

This is a continuation of application Ser. No. 08/344,542, filed on Nov. 22, 1994, now abandoned, which is a continuation of application Ser. No. 07/997,688, filed on Dec. 28, 1992, and now abandoned.

FIELD OF THE INVENTION

This invention generally relates to improvements in filing systems for computers and more particularly to simplifying the interchange of documents between various file systems.

BACKGROUND OF THE INVENTION

Among developers of workstation software, it is increasingly important to provide a flexible software environment while maintaining consistency in the user's interface. An early attempt at providing this type of an operating environment is disclosed in U.S. Pat. No. 4,686,522 to Hernandez et al. This patent discusses a combined graphic and text processing system in which a user can invoke a dynamic menu at the location of the cursor and invoke any of a variety of functions from the menu. This type of natural interaction with a user improves the user interface and makes the application much more intuitive.

The WORD word-processing program and MacWrite word-processing program currently provide a static list of translation programs that are available to use in converting documents. However, there is no capability of adding to the static list dynamically as additional conversion routines are created. Further, there is no system-wide solution to provide dynamic opening of files that are otherwise unrecognizable to the operating system. Today, when a file is selected, and clicked on to initiate opening on a Macintosh® computer or other computer system, if the operating system has not been preprogrammed to recognize the unique characteristics of the particular file, or if the application for handling the file has not been installed, then a standard prompt is issued to the user indicating that processing cannot proceed.

SUMMARY OF THE INVENTION

Accordingly, it is a primary objective of the present invention to provide file conversion capability that searches for alternative programs and translation software on disks connected to a computer both locally and remotely via a communications link, such as a local area network, and allows a user to select from recommended choices for opening or converting a document. The invention offers a user the option of converting one or more documents to a new format in an ergonomic manner. The invention also adds to a user's view of files new information about programs and kinds of documents, even documents created in other operating systems, such as Disk Operating System (DOS), Windows or UNIX.

BRIEF DESCRIPTION OF THE DRAWINGS

FIG. 3 is an example of a prior art display that accompanied an aborted attempt to open a file;

FIG. 4A is an example of a prior art display of file information;

FIG. 4B is an example of a display in accordance with the subject invention;

FIG. 12G is a flowchart detailing the steps for generating a list of contents as identified in step 2000 of FIG. 12B.

DETAILED DESCRIPTION OF THE INVENTION

Figure 1:
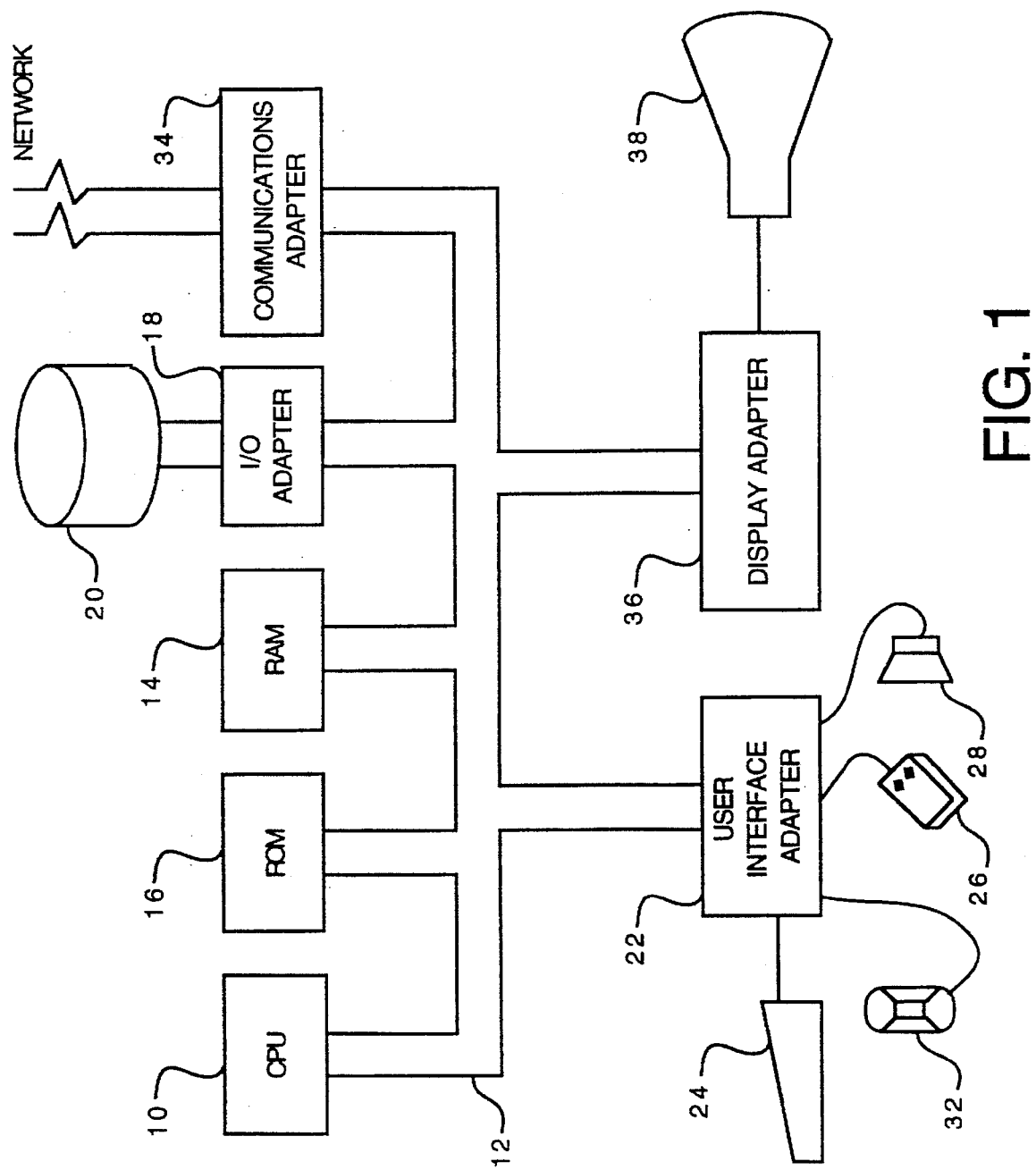
FIG. 1 is a block diagram of a personal computer system in accordance with the subject invention.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7® operating system.

Figure 2:
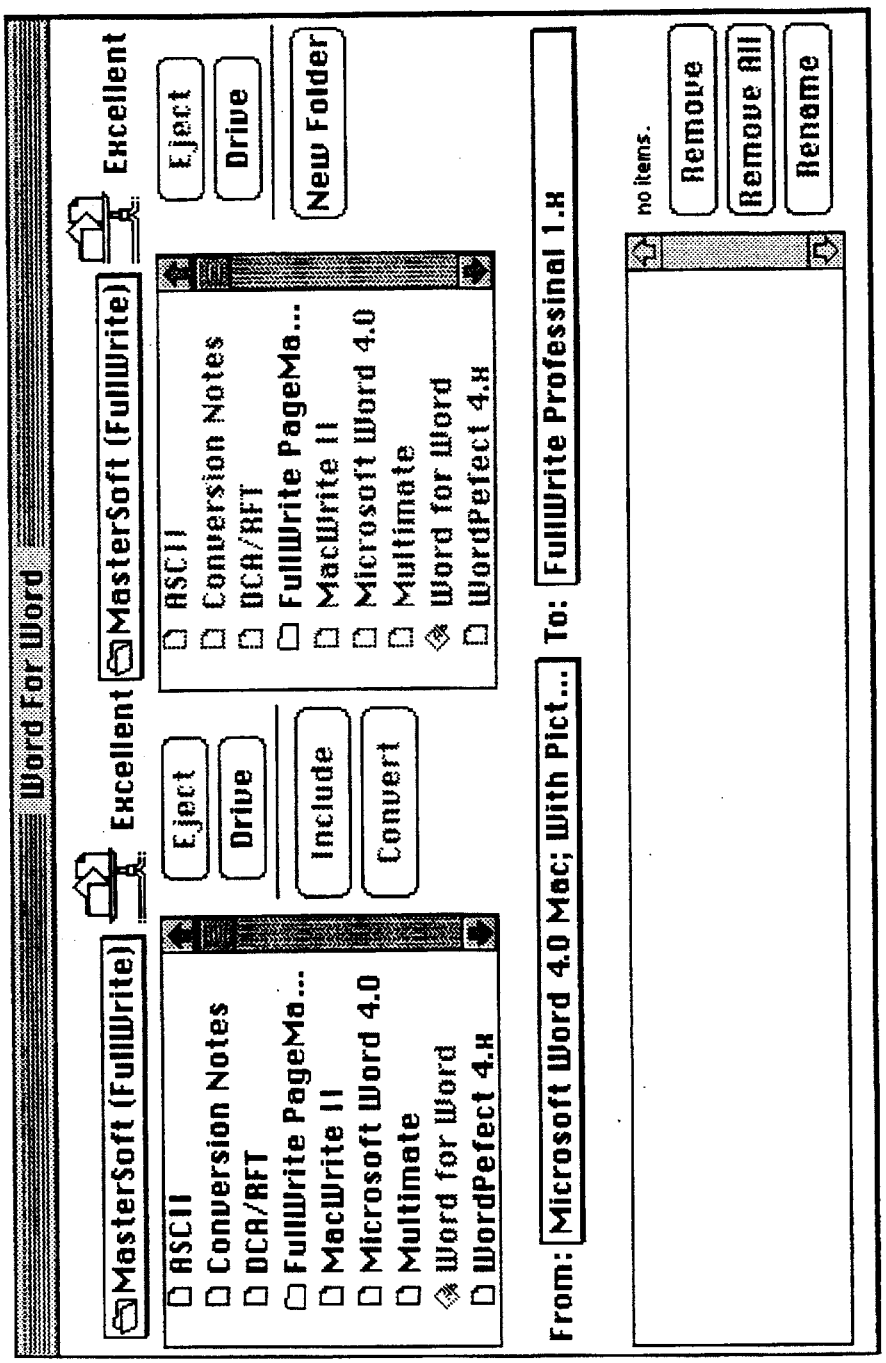
FIG. 2 illustrates a prior art third-party translation tool.

FIG. 2 is an example of a prior art translation program that requires a user to invoke the program and actively select the appropriate translation routine to convert the document to a usable format. In FIG. 3, the typical Macintosh message is illustrated for an aborted attempt to open a file.

The preferred embodiment of the invention is implemented as a system software extension that allows a computer to open a document even if the computer does not have access to the program that created it. Preferably, the invention converts a document into another program's format without opening the document.

The invention makes opening such documents and converting them into another document format as easy as any other Macintosh task. It provides a system with facilities to find programs that can open a document and list the programs for user selection. A user can then select a program that can convert the document using its own internal translation capability, or one that uses specialized translation software.

The invention sets up the conversion process and invokes translation software to perform the conversion. The invention gathers information about documents and programs, uses an expert system to select and list the best options, records user selections, and reminds users of previous selections. The invention also allows a user to experiment with options to determine the one most desirable for a particular document. This facility provides more information about documents which allows a user greater flexibility to explore a wider variety of documents available on personal computers, including documents created with programs not currently active on the system and documents that were created on other computers, such as an Original Equipment Manufacturers (OEM) Personal Computer (PC). FIG. 4A is an example of a prior art display of file names 400 and their associated size 410 and kind 420. FIG. 4B is an example of a display in accordance with the subject invention. At 440, the Kind field has more extensive description information than the prior art display.

Figure 5A:
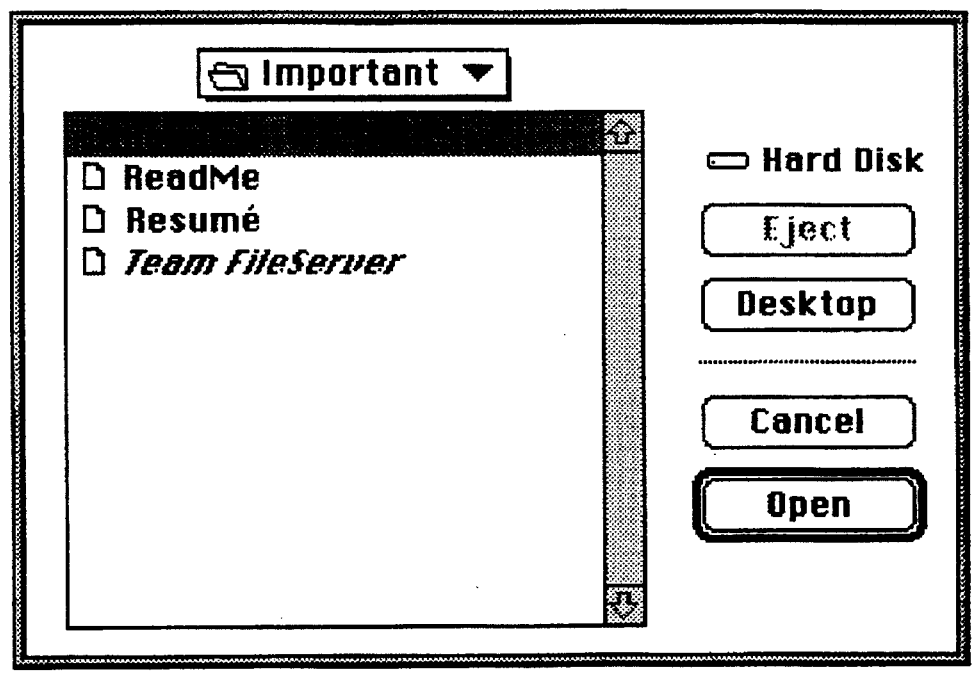
FIG. 5A is an illustration of a prior art Macintosh display of an open operation.
Figure 5B:
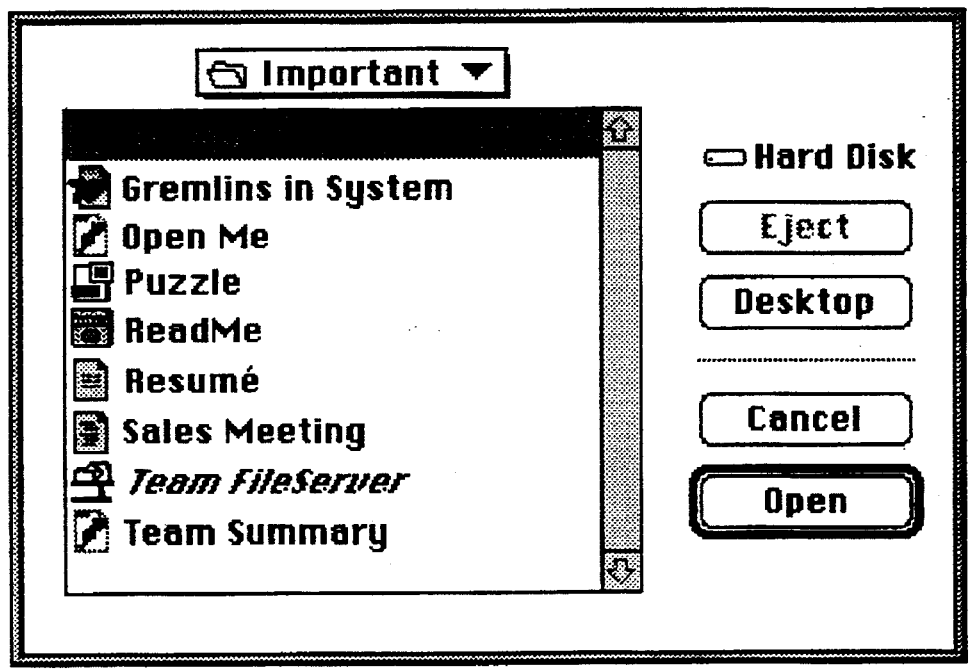
FIG. 5B is an illustration of an Open menu in accordance with the subject invention.

When a user selects to view the contents of disks and folders by name, size, kind, or date, detailed information is ascertainable that would not be available without the invention. FIG. 5A provides an illustration of prior art file views. In contrast, the invention provides a list of all the possible documents that can be opened when used with an application program. When a user selects the Open menu selection from a program's File menu, more documents may be displayed then can be opened with that program. FIG. 5B is an illustration of the Open menu in accordance with the subject invention.

Examples of translation extension files that are typical translation extensions include the XTND for application extension files. These files are designed to link the invention to Claris programs and file translation software. The RTF/styl extension file is an additional file required for translating material when copying and pasting between certain programs, such as between Microsoft Word and MacWrite II.

The invention employs all of the typical Macintosh tools to open documents, to cut and paste between documents, and to use keyboard shortcuts. In addition, the invention allows a user to:

have choices of programs and translation software to use in opening and converting documents;

make specialized document converters for fast, direct conversions; and customize the invention to match a particular user's preferences.

Opening Documents

The procedure that is typically employed on an Apple Macintosh computer is listed by steps below according to the preferred embodiment of the invention. Those skilled in the art will realize that other steps can be substituted without departing from the claimed invention.

1. Double-click the Open Me icon in the Macintosh Easy Open (M EO) disk window. Open Me is a MacWrite, version 5.0, document. One of ordinary skill in the art will readily comprehend that Open Me is an example title of a document and any other document and its associated title can be handled in a similar fashion.

Figure 6:
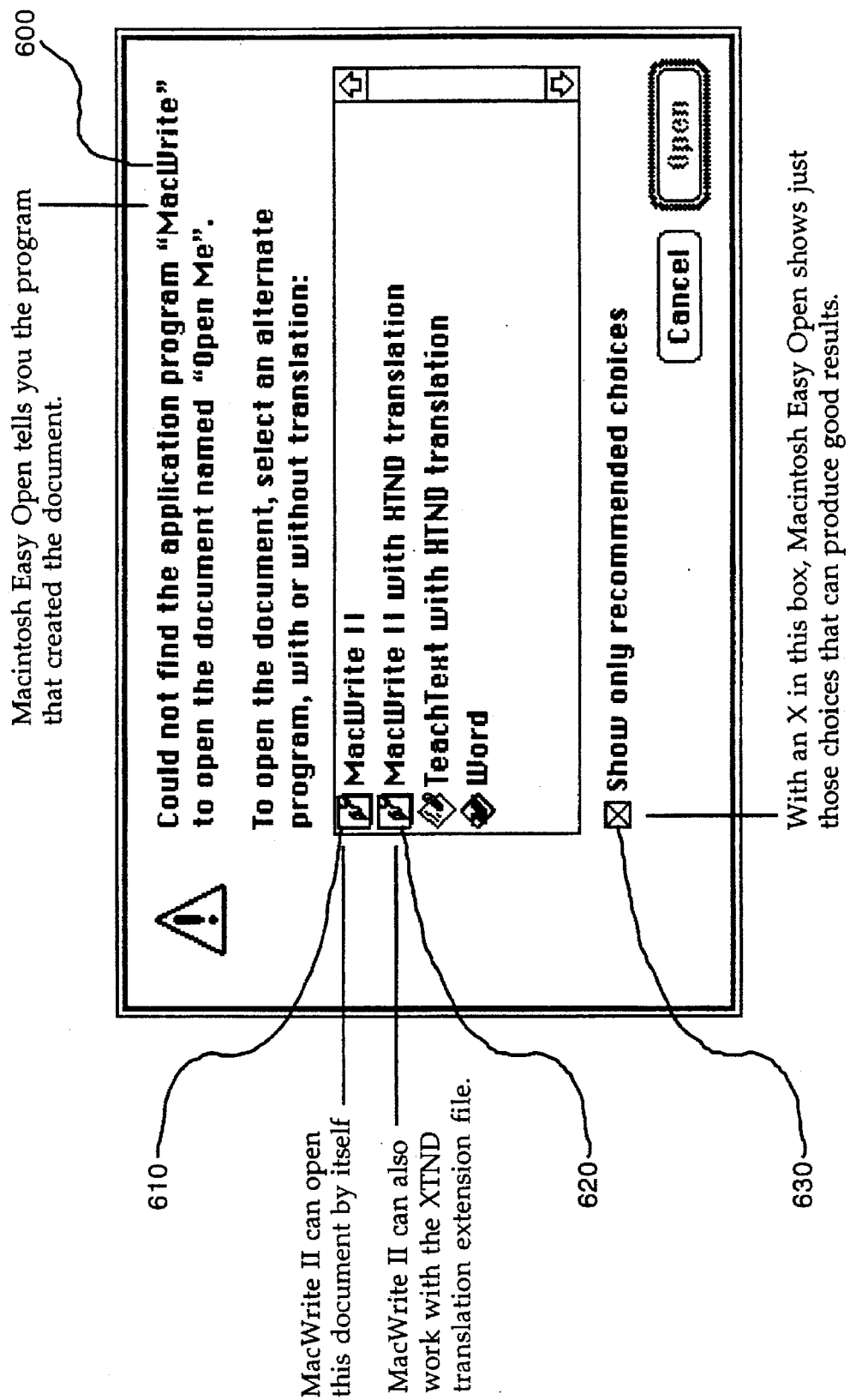
FIG. 6 is a display that is a dynamically presented when a user opens a file in accordance with the subject invention.

2. Review the list and click to select your translation preference. A user selects a single choice at a time. Choices visible to a user depend on the kind of programs and translation software installed on the particular system. Often, choices that include translation extensions offer the best results, but translations can be swapped as desired. FIG. 6 is a display that is dynamically presented when a user opens a file in accordance with the subject invention. At 600, the invention indicates which program created the document. In this case, "MacWrite". Label 610 indicates that MacWrite II can open this document by itself, or at label 620, MacWrite II can also work with a XTND translation extension file. Finally, at label 630, a selection box indicates that options exist for showing only recommended choices.

Figure 7:
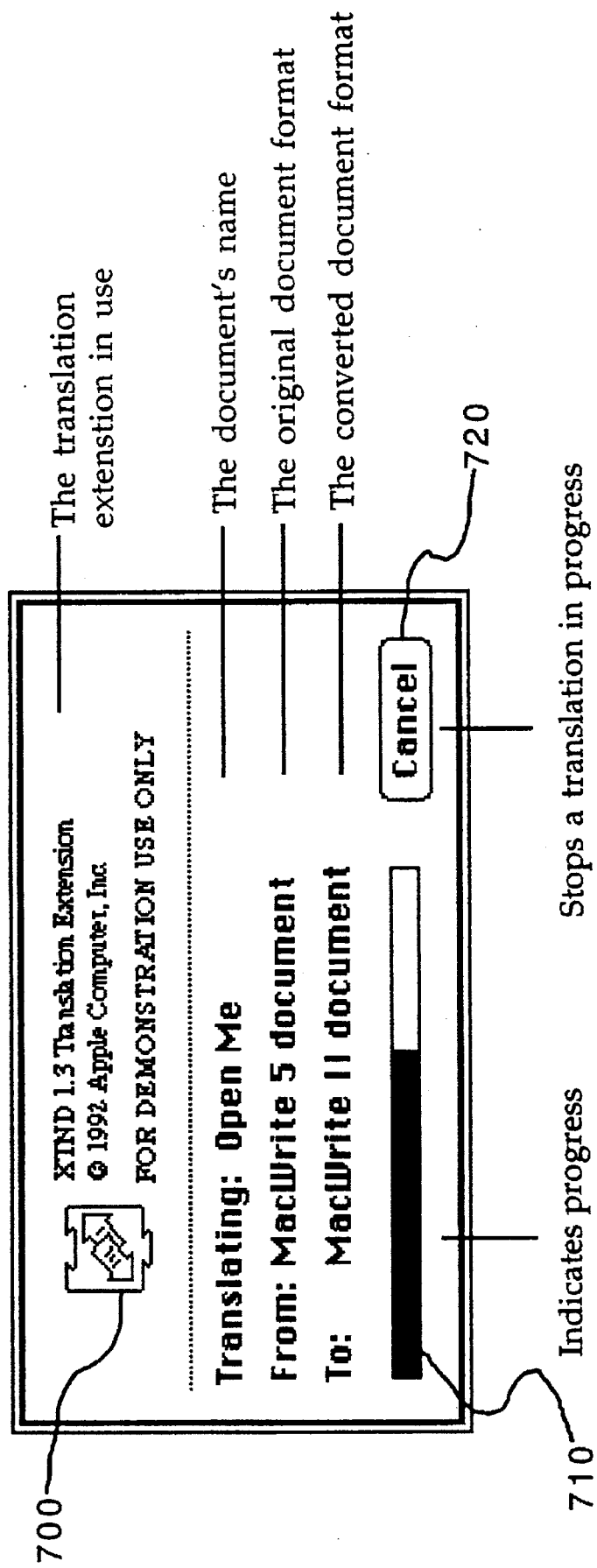
FIG. 7 is a progress indicator which appears as a document is being translated in accordance with the subject invention.

3. Click the Open button. A progress indicator appears as the document is being translated. FIG. 7 is a progress indicator which appears as a document is being translated in accordance with the subject invention. Label 700 explicitly presents the translation extension that is in use. Label 710 indicates the progress that has taken place on the current translation. Label 720 is a selection area for stopping a translation in progress.

4. When the document opens, check to see if the document has been formatted correctly. The invention renames the document to show that it has been converted to a new program format.

Figure 8:
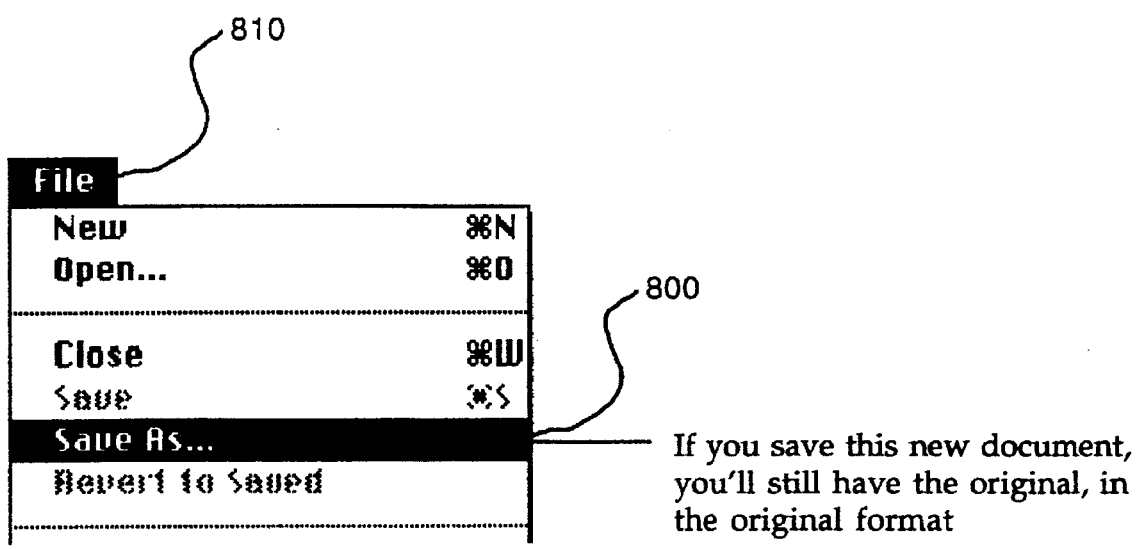
FIG. 8 is an illustration of the File menu in accordance with the subject invention.

5. To save the converted copy, select Save As . . . from the File menu and put the copy in the location of your choice. FIG. 8 is an illustration of the File menu in accordance with the subject invention. At label 800, the Save As option has been selected to enable a user to save a file name of choice. The File menu has been selected as shown at label 810.

Figure 9:
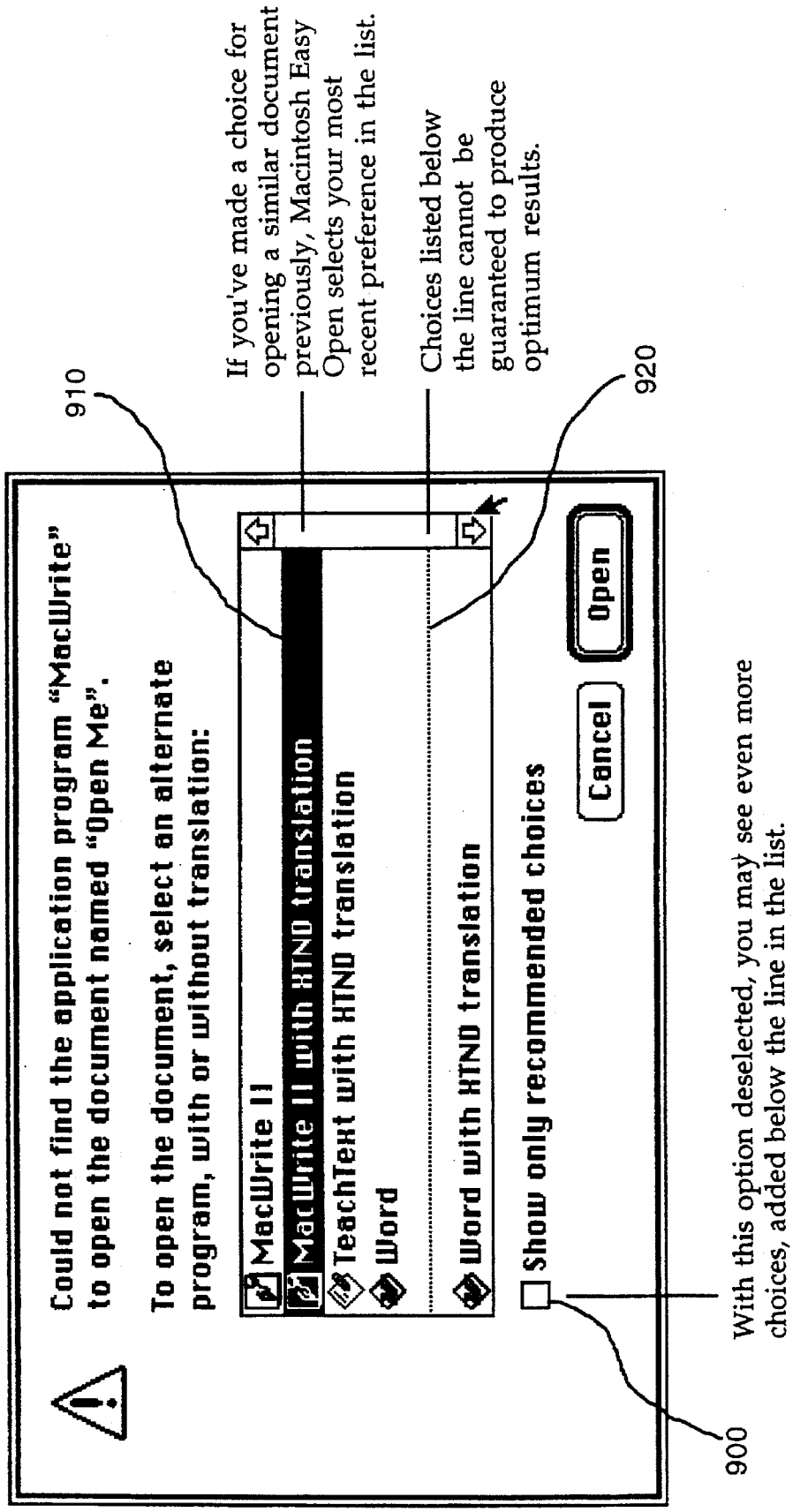
FIG. 9 is an illustration of a document translation display in accordance with the subject invention.

If the results of the translation are unsatisfactory, other options exist:

If you are sure you don't want this choice, you can quit the program, without saving the new document, and double-click the Open Me icon again to make another choice; and If you want to compare results, you can save the converted document, and then open the original again, with a different choice. The invention stores the most recent preference you make for each kind of document and the next time a document of a similar kind is selected, the most recent preference is highlighted in the list of choices. When there are no choices that produce optimum results, the invention displays choices that could open the document simply as text, without the original formatting. The 'Show only recommended choices' option is not available. FIG. 9 is an illustration of a document translation display in accordance with the subject invention. Label 900 is a check box that can be selected if only recommended choices are displayed. Label 910 shows that if you have made a choice to open a similar document previously, then the invention selects your most recent preference in the list. Choices listed below the line, 920, cannot be guaranteed to produce optimum results. When there are only recommended choices available, the invention displays all choices.

Figure 10:
FIG. 10 is an illustration of an operation in which a document icon is dragged and dropped on a program icon in accordance with the subject invention.

A document icon can be dragged to a program icon added to your system, and one or more documents can be automatically opened by dragging document icons to the icon of any program with the ability to open that document as shown in FIG. 10. If the program can open a document, the icon is highlighted. If a program can open the document you drag to it, the invention presents a list of available choices, similar to the list shown in FIG. 6. This list is limited to choices that include the particular application program and any available translation software. Copying and pasting between programs is facilitated by the invention to manage the translation of copied material into an acceptable format in the document where the information is pasted.

Document Converters

A document converter is a convenient system utility that is set up to convert documents to a specific program's format without opening the document. Once a document converter is initialized for a particular type of conversion, documents can be converted easily and quickly, by dragging their icons to the converter icon. A specific document converter icon can be set up for each type of document.

Follow these steps to set up a document converter:

1. Select the Document Converter on your hard disk and choose Duplicate from the File menu.

2. Open the copy of the document converter.

3. Click the kind of document you want this converter to create.

4. Click the Set button.

The invention assigns a new document converter name. This name can be changed at the user's discretion.

Converting Documents

Once a document converter is properly initialized, it is easy to use. To convert a document, drag the Open Me icon to the document converter icon and release the mouse button. Both icons become highlighted, showing that the conversion has begun. The invention creates a copy of the document, adds (Converted) to the document name, and leaves the original untouched. To convert a group of documents to a new format, select the icons and drag them to a document converter that has been initialized.

Initializing Invention Options

A number of options exist to provide customization of the invention.
Options:

On/Off

When you don't need to translate documents, you can turn off the translation features. However, as long as the inventive system software resides on the startup disk, enhanced information will still be available in the Finder, and in the list views of files, and document converters are still available for use. Finder is discussed in detail in "Inside Macintosh", vols. I–VI, published by Addison-Wesley Publishing Co., 1985–91.

Always Show Choices

With Always Show Choices selected, the system presents a list of choices even if a preference has been selected for opening a particular kind of document. When this option is deselected, the invention activates the preferences you have established without asking for your confirmation.

Include Choices from Servers

The invention is normally set to search for programs on all available disks, even on file servers that have been made available on a desktop. Using a program on a remote disk over a network could take a long time. To have the system search for programs only on hard disks directly connected to the system, click to deselect this control.

Delete Preferences

To erase the invention's record of choices made for specific translation preferences, click the Delete Preferences button. For example, when new translation software is available, it may be convenient to delete all your previous choices at once and let the system prompt you for each new choice.

Dynamic Translation List

In a computer where the operating system provides the user with a standard user interface for opening files, the invention provides the operating system with the file formats that the application can currently open based on the external translator files that have been installed. The invention builds a list of files that can be manipulated by an application program on-the-fly to facilitate current capabilities as discussed in detail below.

Detailed Logic Dynamic Application Open Capabilities

Figure 11A:
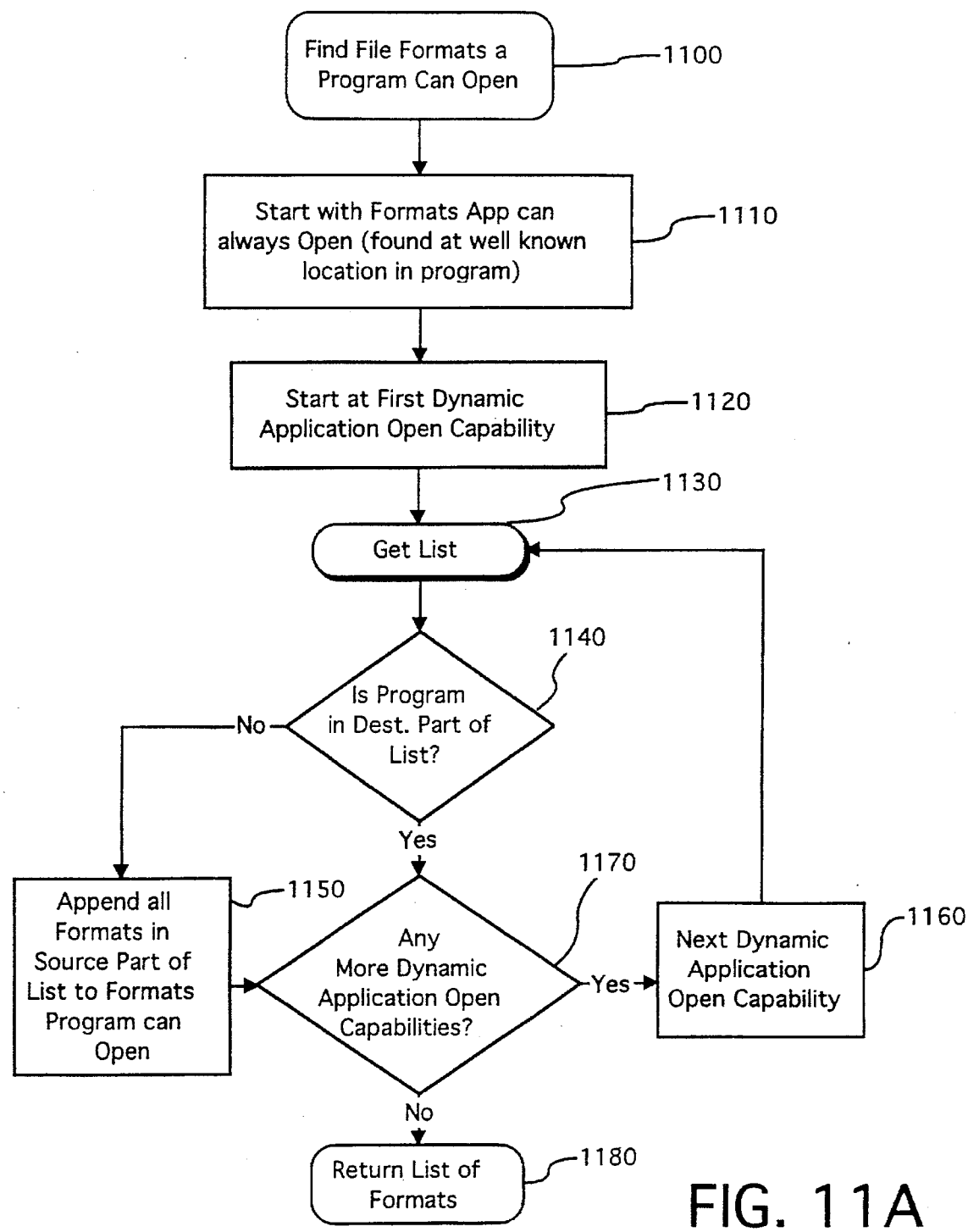
FIG. 11A is a flowchart detailing the steps for determining the formats of documents a particular application program will open.
Figure 11B:
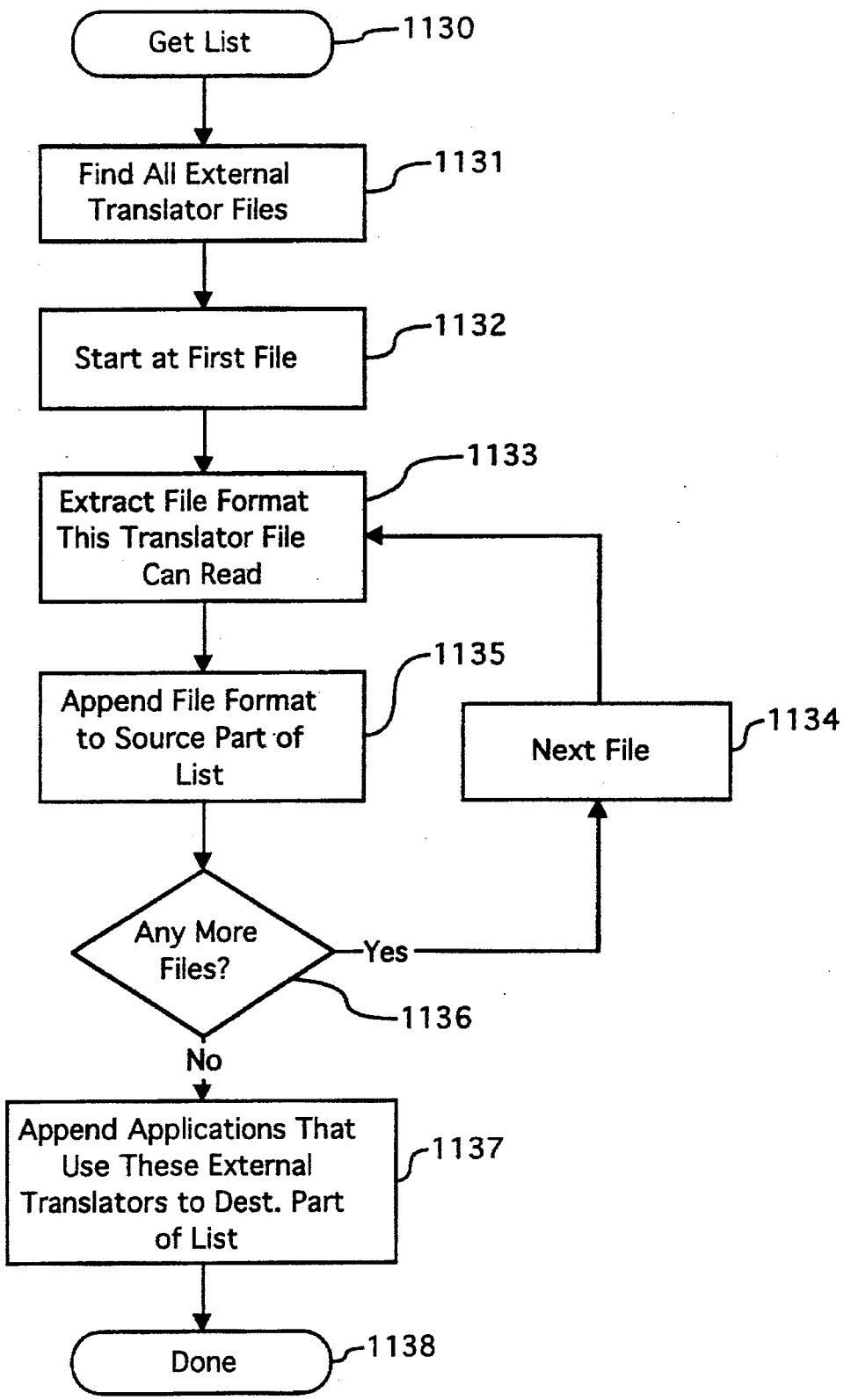
FIG. 11B is a flowchart detailing the steps for getting a list as identified in step 1130 of FIG. 11A.

The system and method for determining what formats of documents a particular program are determined in a dynamic manner and interactively presented to the user according to the logic presented in FIG. 11A and FIG. 11B. Processing commences at function block 1100 where a general overview of the logic is presented. The logic finds file formats that a particular program can open and operate on. Then, at function block 1110, processing is initiated by starting with formats that an application can always open. This information is located at a predetermined location in most application programs. preferrably then, the first Dynamic Application Open Capability (DAOC) is commenced by obtaining a list of applications employing standard System 7 operations as shown in function block 1120 and 1130.

The detailed logic associated with function block 1130 is presented in FIG. 11B. Processing commences at function block 1131 where all external translator files are identified. Then, commencing at the first external translator file as depicted in function block 1132, the extract file format that the first translator file can read is identified as shown in function block 1133. Then, in function block 1135, the file format corresponding to the file translator file is appended to the source part of the list. A test is performed next at decision block 1136 to determine if any additional translator files are available. If so, then the next file is selected at function block 1134 and the file format that the translator file can process is determined at function block 1133. If no more files remain, then the applications that use these external translators is appended to destination part of the list, and processing is returned at terminal 1138 to decision block 1140 of FIG. 11A.

A test is performed at decision block 1140 to determine if a program is located in the destination portion of the list. If a program is located, then at function block 1150 all formats are appended to the list of programs that can be opened. Then, processing passes to decision block 1170 to determine if any more DAOC remains to be processed. If no more processing is necessary, then the completed list of files that can be opened is returned to the user at terminal 1180. If more files are available for processing, then the next DAOC is selected in function block 1160 and control passes to function block 1130 for updating the list with the next DAOC.

FIGS. 12A–G are flowcharts of the detailed logic of a translation dialog in accordance with the subject invention. The translation dialog is a portion of the user interface that presents translation possibilities to a computer user. The possibilities are based on the proposition that a user does not really require knowledge of the translation processing, only that the translation is done in an effective manner consistent with normal file processing operations. Processing commences at function block 1200 when the system detects that a user has double-clicked on a document.

A test is performed at decision block 1202 to determine if the application that created the document that was double-clicked on in function block 1200 is installed on the system. If the application exists on the system, then the document is opened as reflected in function block 1212. If the application does not exist on the system, then another test is performed at decision block 1204 to determine if the invention can open the document. If not, then an appropriate message is presented to the user at function block 1214. However, if the document can be opened using the invention, as is usually the case, then the invention's translation dialog is applied to the document as shown in function block 1206 and detailed in FIGS. 12B–12G.

Figure 12A:
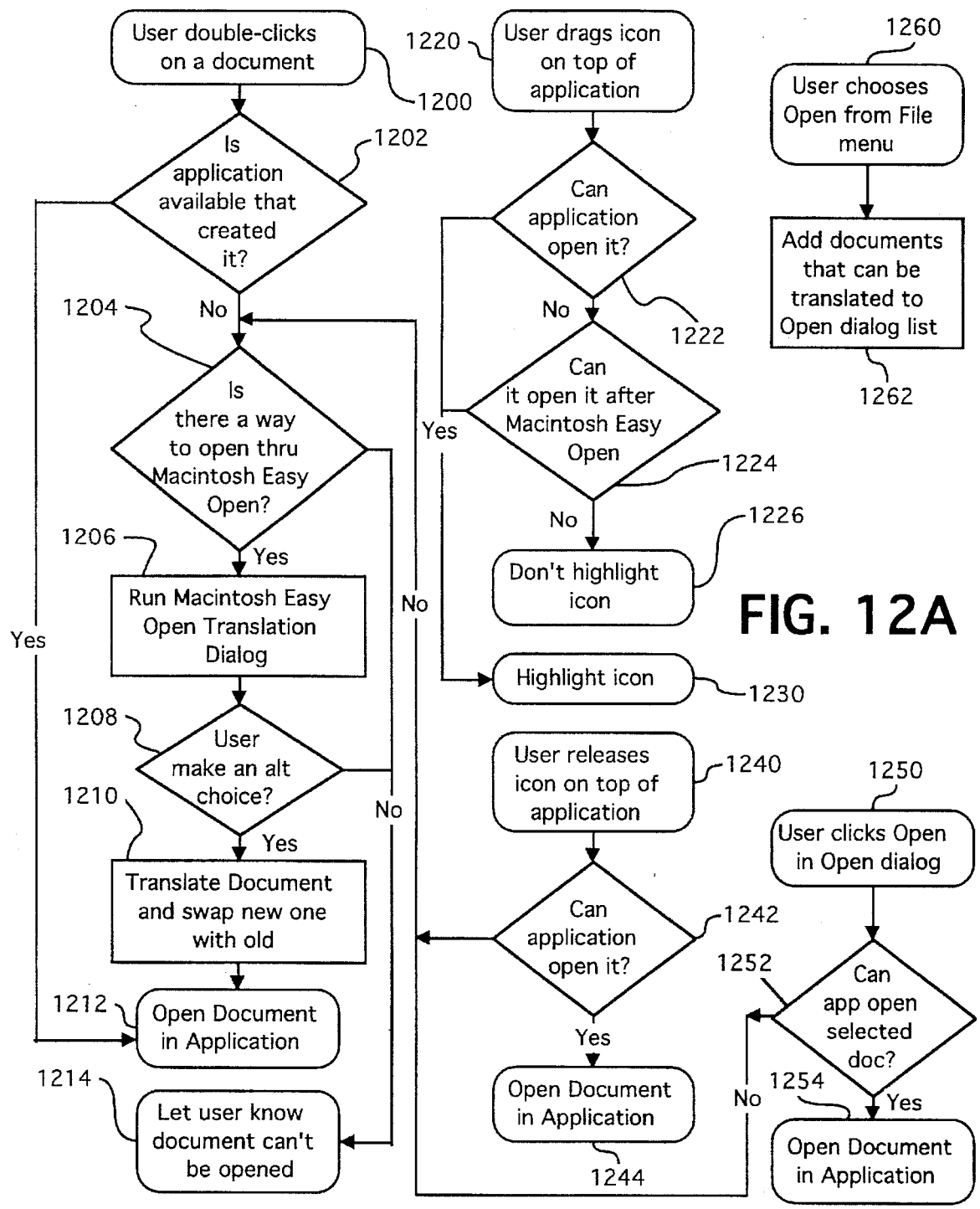
FIG. 12A is a flowchart detailing the steps relating to the translation dialog of the present invention.
Figure 12B:
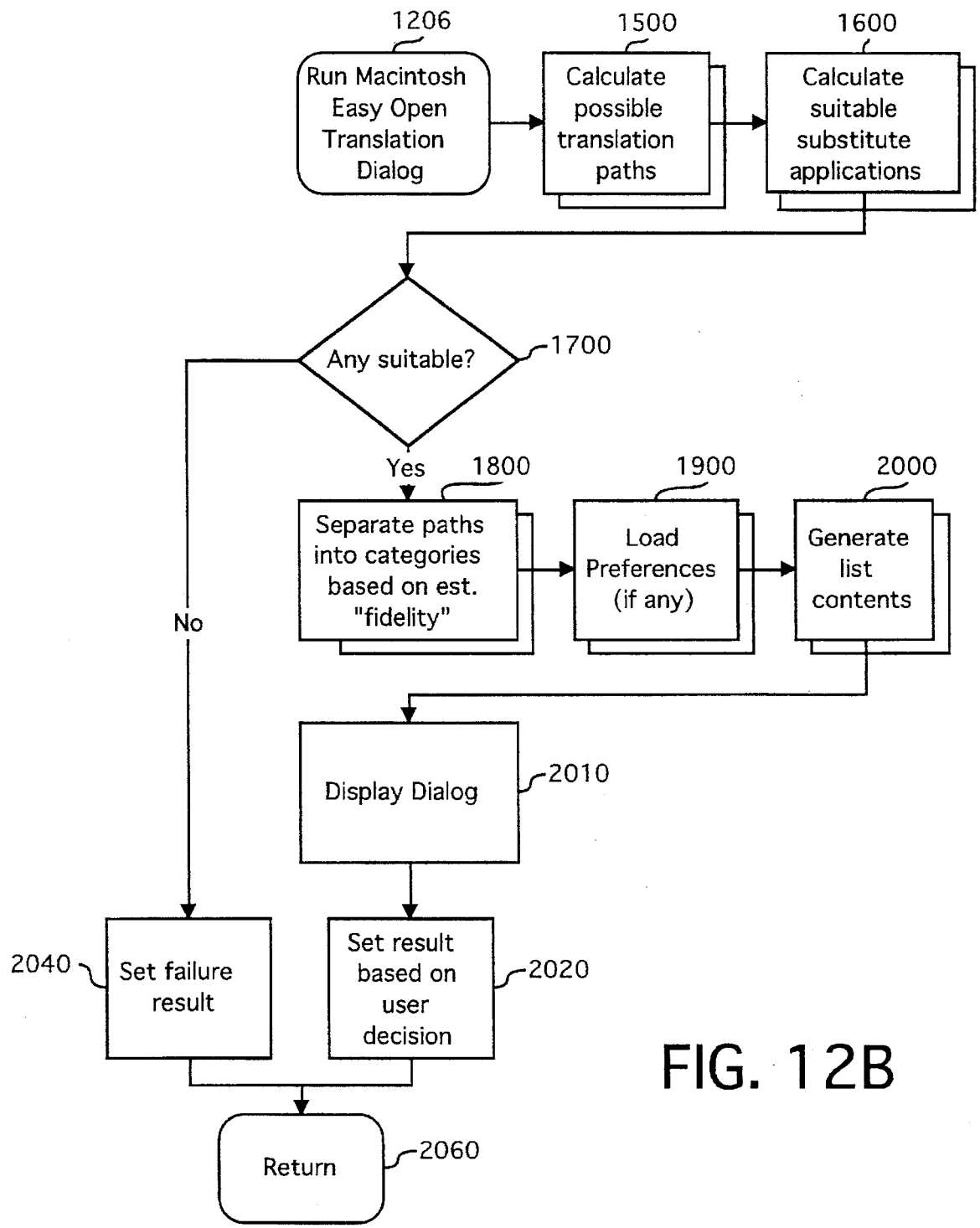
FIG. 12B is a flowchart detailing the steps of running the Macintosh Easy Open translation dialog identified in step 1206 of FIG. 12A.
Figure 12C:
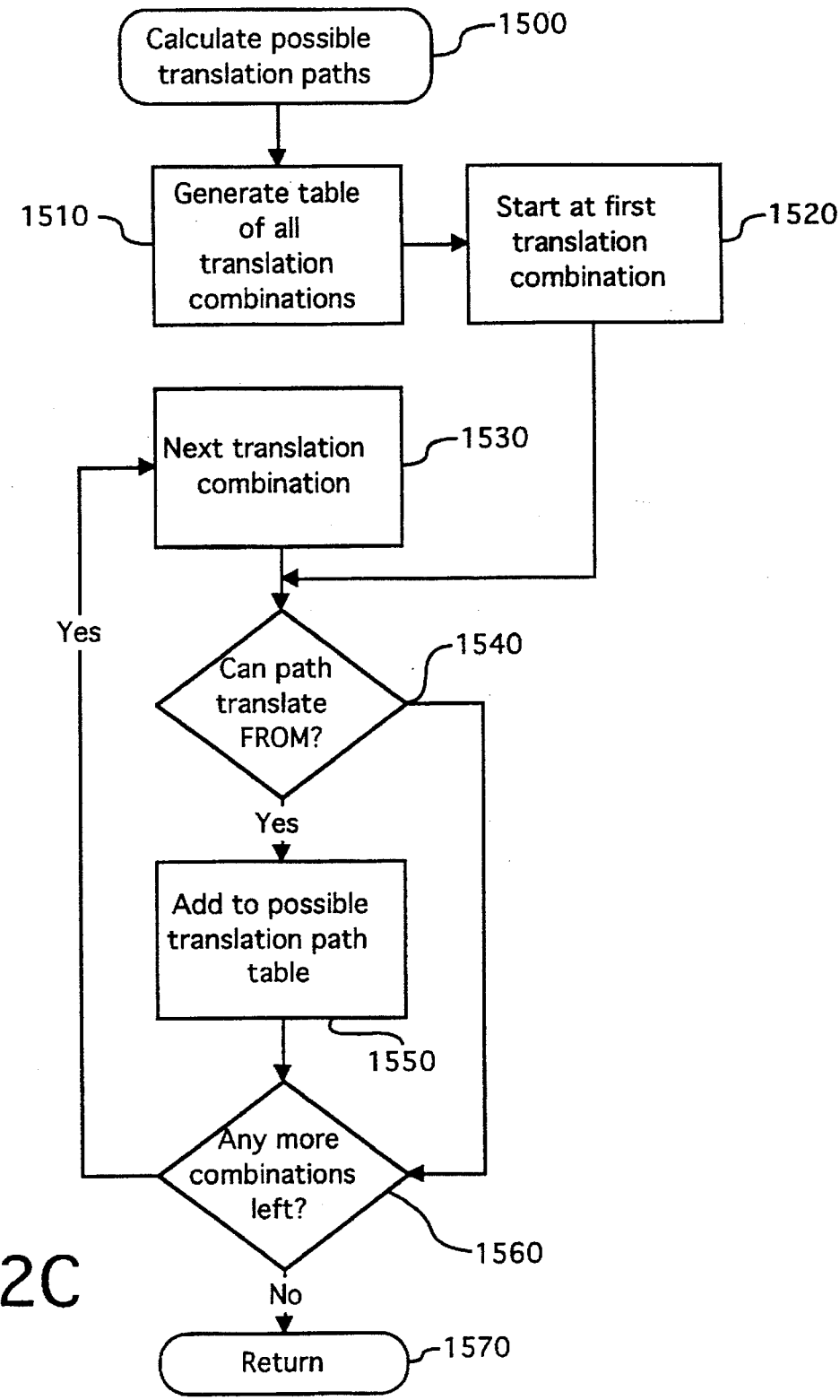
FIG. 12C is a flowchart detailing the steps for calculating possible translation paths as identified in step 1500 of FIG. 12B.

FIG. 12B begins the expansion of the logic associated with function block 1206 where the inventions translation dialog transpires. The first processing occurs at function block 1500 where the possible translation paths are calculated. The logic associated with this function block is detailed in FIG. 12C. Processing commences at function block 1510 where a table is generated of all translation combinations that are defined for the system by starting with the first translation combination at function block 1520 and processing all other combinations in a loop commencing with the next translation combination at function block 1530. Then, a decision is made at decision block 1540 to determine if a path can translate from the document the user attempted to open. If so, then the translation combination is added to possible translations in the table as shown in function block 1550. A test is performed at decision block 1560 to determine if any more combinations remain and if none are left then processing returns to label 1600 of FIG. 12B. If additional translation combinations remain, then processing is returned to function block 1530.

Figure 12D:
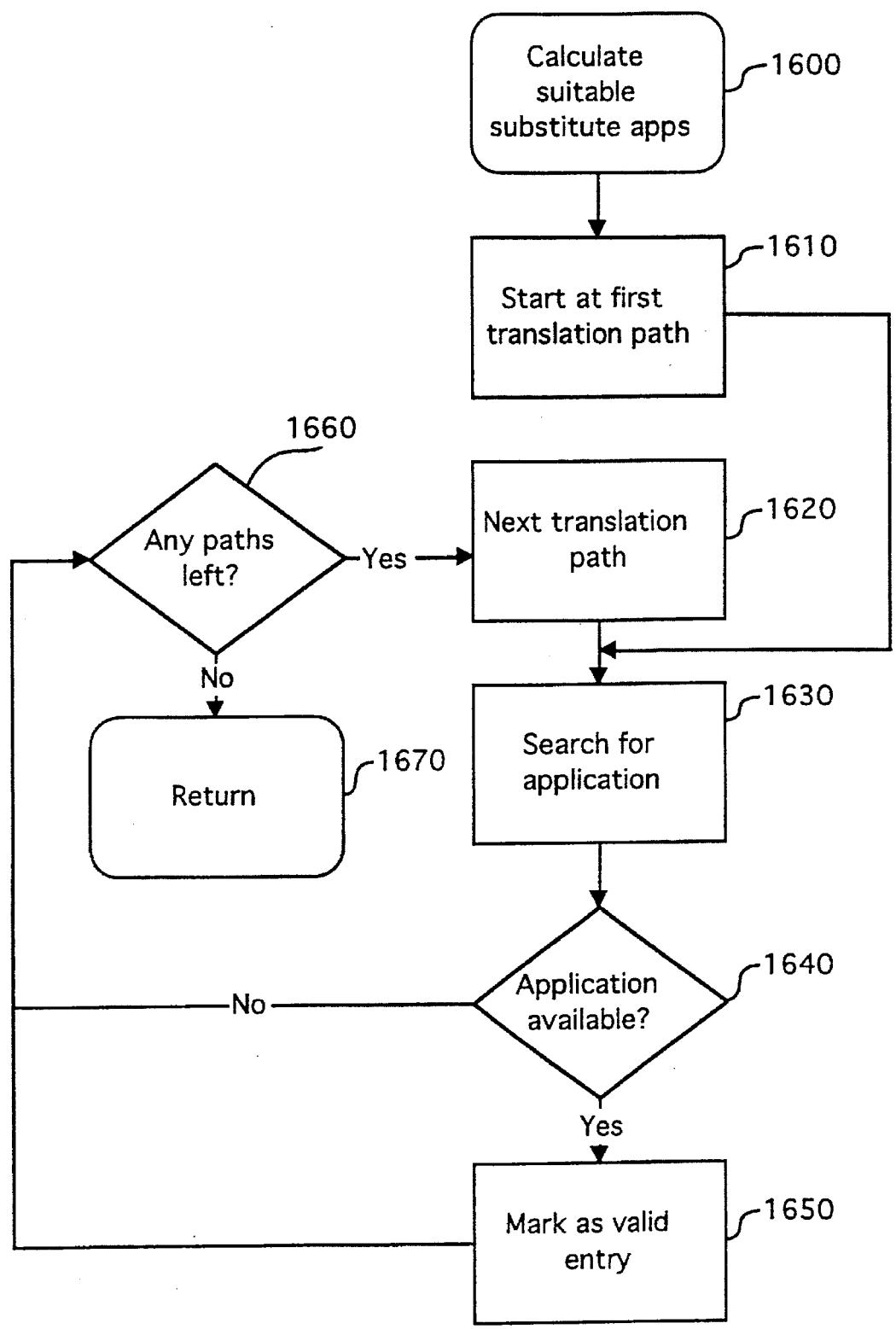
FIG. 12D is a flowchart detailing the steps for calculating suitable substitute applications as identified in step 1600 of FIG. 12B.
Figure 12E:
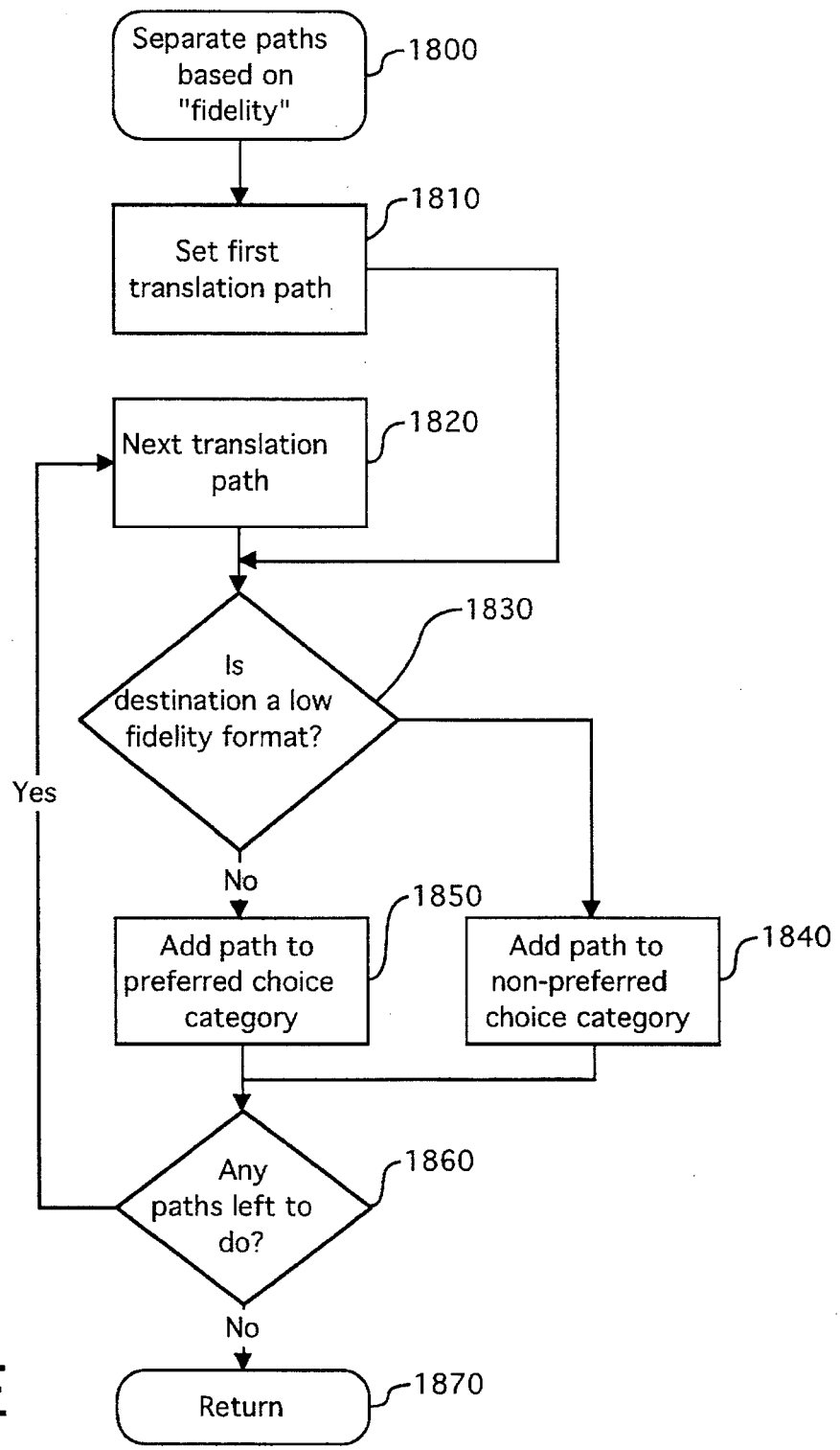
FIG. 12E is a flowchart detailing the steps for identifying separate translation paths as identified in step 1800 of FIG. 12B.
Figure 12F:
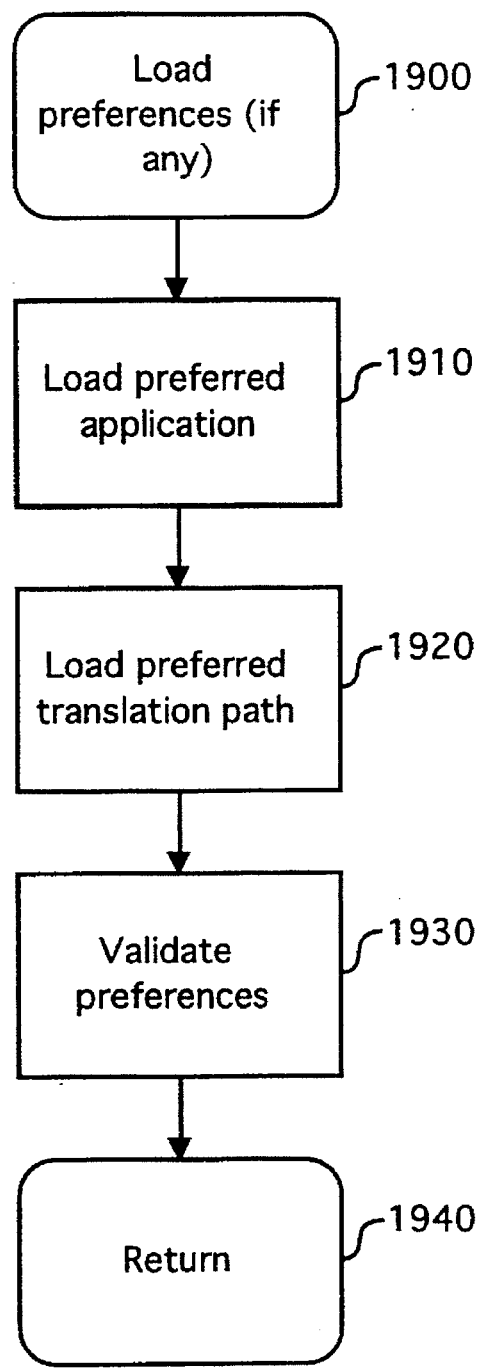
FIG. 12F is a flowchart detailing the steps for loading preferences as identified in step 1900 of FIG. 12B.

The logic in function block 1600 of FIG. 12B is expanded in FIG. 12D. Processing commences at function block 1610 by commencing with the first translation path, and then processing the next translation path as shown in function block 1620. Then, a search is performed in function block 1630 to determine if an application is installed on the system to open the selected document. If an application is located in decision block 1640, then, in function block 1650, the application is marked as a valid entry. If the application is not available in decision block 1640, then a test is performed at decision block 1660 to determine if any other paths remain. If additional paths remain, then the next translation path is selected at function block 1620. If no additional paths remain, then control is returned at terminal 1670 to decision block 1700 of FIG. 12B.

A test is performed at decision block 1700 of FIG. 12B to determine if a suitable translation dialog has been identified. If none is detected, then a failure result is set in function block 2040 and control is returned to decision block 1208 of FIG. 12A. However, if a suitable translation dialog has been ascertained, then the paths are separated into categories based on established fidelity as shown in function block 1800 and detailed in FIG. 12E. Fidelity refers to the amount of data preservation between formats. For example when a WORD document is convened to ASCII format, all of the formatting information is lost. However, when a WORD document is converted to WordPerfect via a translator, the formatting is conserved. Thus, ASCII translation is low fidelity and WORD to WordPerfect is high fidelity. Processing commences in function block 1810 where the first translation path is set. Then, in function block 1820, the next translation path is selected and a test is performed in decision block 1830 to determine if the destination is a low fidelity format. If the destination is a low fidelity format, then the path is set to a non-preferred choice category in function block 1840 and control passes to decision block 1860. If the destination is not a low fidelity format, then in function block 1850, the path is added to a preferred choice category and control passes to decision block 1860 to determine if any paths remain to be processed. If additional paths remain, then control passes to function block 1820 to process the next path. If no paths remain, then control passes to terminal 1870 where processing is passed back to function block 1900 of FIG. 12B.

Preferences are loaded in function block 1900. The details of the logic for the load preference operation are contained in FIG. 12F. Processing commences at function block 1910 where the preferred applications are loaded. Then, at function block 1920, the preferred translation path is loaded. Finally, at function block 1930, the preferences are validated and control is returned at terminal 1940 to function block 2000 of FIG. 12B.

A list of contents is generated as shown in function block 2000 and detailed in FIG. 12G. Processing commences at function block 2100 where the start translation path is set. Then, in function block 2110 the next translation path is selected and the application name is obtained at function block 2120. Then, a test is performed at decision block 2130 to determine if the path can use the translation system. If so, then the translation system name is obtained at function block 2140 and control passes to function block 2150. If not, then control passes to function block 2150, to append the entry to the list of translation files. Then, at decision block 2160, a test is performed to determine if the entry is the preference, if so, then the preferences is selected at function block 2170 and control passes to decision block 2180. If not, then control passes to decision block 2180 to determine if any paths are left to process. If additional paths remain, then control passes to function block 2110 to process the paths. If not, then control is returned via 2190 to function block 2010 of FIG. 12B.

Function block 2010 displays the dialog shown in FIG. 6 and sets the result based on the user decision as shown in function block 2020. Thereafter control returns via terminal 2060 to decision block 1208 of FIG. 12A. A test is performed at decision block 1208 to determine if the user has overridden the preferred translation program. If the user has not overriden the preferred translation program, then the user is so informed at function block 1214. If the alternate choice is appropriately selected, then the document is translated at function block 1210, the documents are swapped, and the document is opened as shown in function block 1212.

Alternatively, if a user drags an icon onto an application as shown in function block 1220, then a test is performed to determine if the application can open the document the icon represents at decision block 1222. If the document can be opened, then the icon is highlighted to so indicate. If the document cannot be opened by the application, then a test is performed at decision block 1224 to determine if the document can be opened employing the logic presented in FIG. 11. If the invention can be used to open the document then control passes to function block 1230 to highlight the icon. If the invention cannot be used to open the document, then the icon is not highlighted as shown in function block 1226.

If a user releases a document icon proximal to another application as indicated in function block 1240, then a test is performed at decision block 1242 to determine if an application can open the document. If no application is available, then processing passes to decision block 1204 to use the invention to process the document as described earlier. If an application can open the document, then the document is opened as shown in function block 1244.

If a user selects Open from the File Menu as shown in function block 1260, then documents are added that can be translated to the Open dialog list as shown in function block 1262. Finally, if a user clicks Open in an Open dialog, then a test is performed at decision block 1252 to determine if an application can open the selected document. If an application can open the document, then the document is opened as shown in function block 1254. If the application cannot be opened, then control passes to decision block 1204 to employ the invention to open the document.

Application Details

Figure 13:
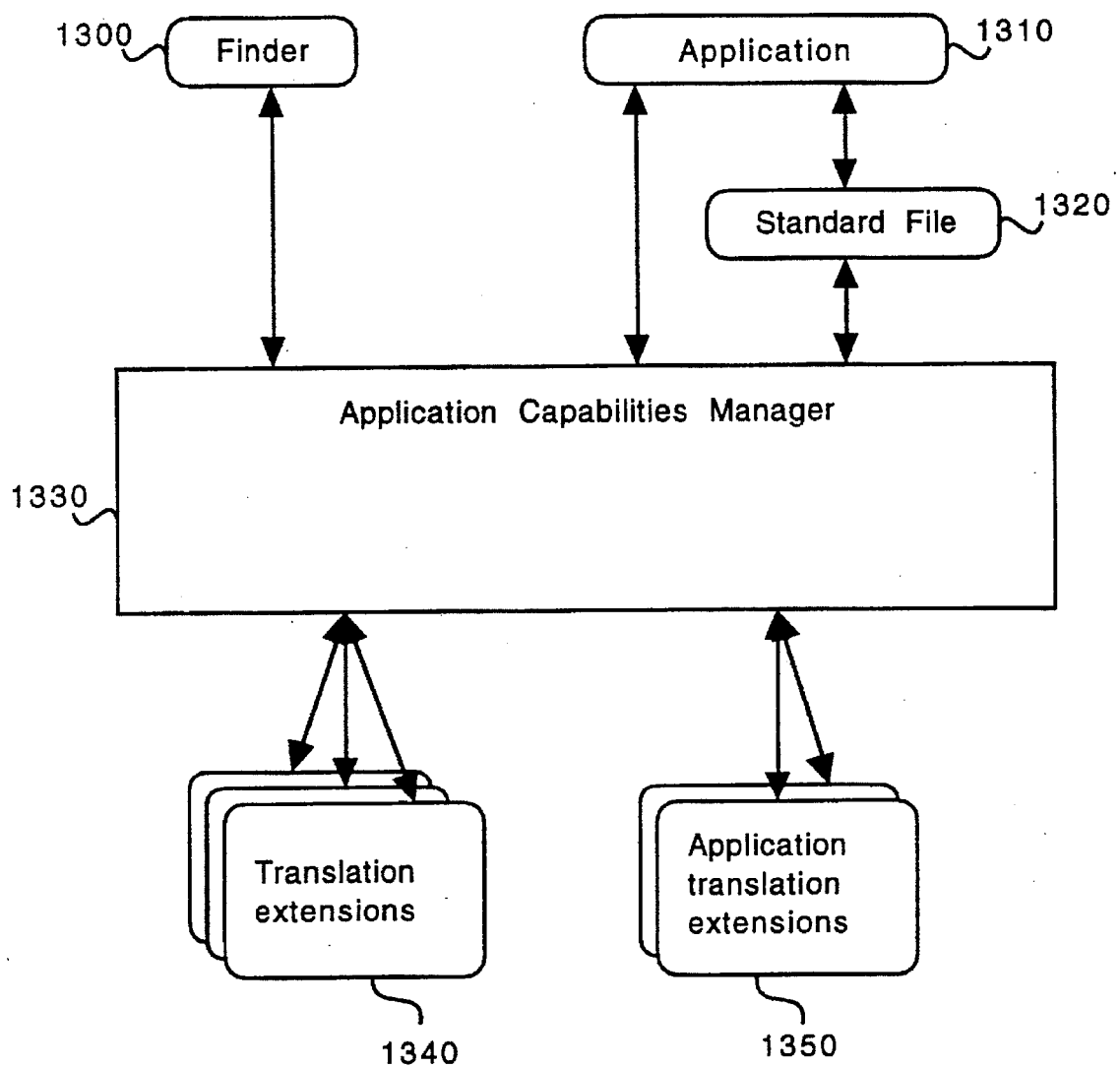
FIG. 13 is a block diagram in accordance with the subject invention.

There are two programmatic views of the subject invention. One is the toolbox services it provides to the Finder, StandardFile, and future applications. This is called the Application Capabilities Manager. The other view is the services it requires from translation extensions. FIG. 13 is a block diagram in accordance with the subject invention. Finder 1300 is a part of the standard Apple System 7 operating system, and is responsible for normal file processing routines, including opening a document. Application 1310 can be a wordprocessing or other application for acting upon standard files 1320. The application capabilities manager 1330 provides the services that the Finder 1300 requires to perform document translation. Translation extensions 1340 are a set of translation operatives for files that are not application files. Application translation extensions 1350 include translation extensions for applications. These pans will be discussed in detail below.

Declaring the File Types Your Application Can Open

In Apple system software versions 7.0 and later, the Finder determines which types of files an application can open by inspecting the resources of type 'FREF' whose resource IDs are listed in an application's bundle (that is, application's resource of type 'BNDL'). Finder uses this information to determine which file types can be drop-launched onto a given application. All file types in the 'FREF' resources listed in an application's bundle, regardless of whether they have associated icons, are considered droppable on that application.

In some cases, however, an application may include 'FREF' resources for file types that should not be opened. For example, an application might use non-document files such as dictionaries and help files. Even though these files should have icons and hence deserve 'FREF' resources, their contents cannot be displayed to a user. Similarly, an application might read data from preferences files; this data is intended to be used internally by the application, not opened by a user as a document. Because the list of file types an application can open may be different than the list of types that have icons, the Translation Manager defines a new resource of type 'open'. The open resource declares which file types an application can open as documents. A Rez input form of a sample resource of type 'open' is presented below.

```
/*open resource for TeachText*/
resource 'open' (128)
{
    'ttxt', { 'ttro', 'PICT', 'TEXT' }
};
```

An open resource consists of an application signature followed by a list of file types. It indicates the specified application can open files whose types occur in the list. For example, TeachText can open documents created in its own private format, 'ttro', as well as documents of file type 'PICT' and 'TEXT'. If Macintosh Easy Open is available, Finder allows a user to drop documents of those types onto the application. In addition, if any translation-extensions are installed, all documents that can be translated to one of the specified types can also be dropped on the application. So, if a translation extension exists that can translate documents of type 'SURF' into the file type 'ttro', the user can drop SurfWriter documents onto TeachText. If the Translation Manager has to choose between multiple file types as the destination file type for a translation, it chooses the file type that occurs earliest in the list. The open resource is also used by the routine StandardOpenDialog to determine which documents should be listed in the file opening dialog box.

It's possible that the types of files an application can open must be determined dynamically (perhaps by inspecting which filters are available in a certain folder). Filters refer to the available translation routines for a particular application. If so, the system cannot list those file types statically in an open resource. Instead, a simple translation extension must be written to generate a list of openable file types at runtime.

Writing a Translation Extension

A translation extension is a component that works with the invention to provide data recognition and translation capabilities. Because a translation extension is a component, it must respond to standard selectors sent by a Component Manager. In addition, a translation extension must perform the-following tasks:

communicate its translation capability to Macintosh Easy Open identify the formats of specific documents and scraps translate documents and scraps Scraps refer to portions of documents, for example the portions used in a cut and paste operation. Translation extensions identify and translate files, scraps, or both. A translation extension handles files or scraps by setting bits in the component flags field in the 'thng' resource. The lone exception to this rule concerns applications that need to determine dynamically which file types they can open.

```
FileType and ScrapType data types:
TYPE
    FileType
        = OSType;                            {file types}
    ScrapType
        = ResType;                           {scrap types}
```

The ScrapType data type describes the format of data in memory. In general, the scrap types used by the invention are identical to scrap types used by a Scrap Manager. There is, however, one notable exception. The invention defines a new scrap type, 'stxt', to describe styled text. A scrap having format 'stxt' is formed by appending the text to the style information. This is necessary to have a single scrap pass to a scrap translation extension. The FileType data type describes the format of a file. Often, but not always, the format of a file's data can be identified by inspecting the file's type, as maintained in the HFS catalog file (hereafter called the file's catalog type). For purposes of translation, however, it is sometimes necessary to use a more specific identification. For example, a developer might revise an application but retain the existing file type for documents the application creates. This could cause problems for translation extensions, which might be able to translate a specific version of the file's data format but not later ones. Similarly, some applications that create files on Macintosh computers (such as electronic mail programs or disk mounting utilities) often use standard file types (such as 'TEXT' or 'BINA') as the default new file type. Once again, a translation extension needs more information about the actual format of the data in the file before it can translate it to some other format.

To avoid problems associated with using a file's catalog type as the only indication of the file's data format, the invention defines a translation file type. In many cases the catalog file type is sufficient as the translation file type. However, the invention always presents a translation extension the opportunity to inspect a particular file to see whether its catalog file type is indeed sufficient for translation purposes. If an extension can identify a more specific format, it will return that information to the invention.

Translation Extension Data Structures

This section describes the data structures necessary for writing a translation extension. File Type Specifications describe document formats in a file translation list. The interpretation of some of the fields of a file type specification depend on whether the specification occurs in the list of source document types or in the list of destination document types. A file type specification is defined by the FileTypeSpec data structure.

```
TYPE FileTypeSpec =
    RECORD
        format:
            FileType;
        hint:
            LongInt;
        flags:
            TranslationAttributes;
        catInfoType:
            OSType;
        catInfoCreator:
            OSType;
    END;
``` format The translation file type of the document. The invention uses this field as the canonical way to describe the format of a file for translation purposes.

hint A four-byte value reserved for use by your translation extension.

flags A four-byte value consisting of bit flags that specify how to control the translation. This field is used only for destination file types; you should set it to 0 for all source file type specifications. Currently two bits are defined; all other bits should be cleared to 0:

```
CONST
    taDstDocNeedsResourceFork = 1;
    taDstIsAppTranslation = 2;
```

Before the invention invokes a translation routine DoTranslateFile, it creates the destination file's data fork. The bit specified by the constant taDstDocNeedsResourceFork is set if the translated document also requires a resource fork.

The bit specified by the constant taDstIsAppTranslation should be set if an extension doesn't perform the translation because an associated application can already translate the specified file type into the desired format.

catInfoType The type of the file as contained in the volume's catalog file.

catInfoCreator The creator of the file as contained in the volume's catalog file. In file type specifications occurring in the list of source document types in a file translation list, Macintosh Easy Open uses the format and catInfoCreator fields to determine the kind string displayed in the "From" format specification in the translation progress dialog box.

In file type specifications occurring in the list of destination document types in a file translation list, the invention uses the format and catInfoCreator fields to determine the kind string displayed in the "To" format specification in the translation progress dialog box. The format and catInfoCreator fields are also used to get the information displayed in the Document Converter dialog box. However, the invention uses the catInfoType and catInfoCreator fields to determine the file type and creator of the translated file.

File Translation Lists

The FileTranslationList data structure to describe which file formats your extension can translate into which other file formats. The Translation Manager uses the file translation list that it gets from each translation system to create a master database of its translation capability.

```
TYPE FileTranslationList =
    RECORD
        modDate:
            LongInt;
        groupCount:
            LongInt;
        {group1SrcCount:
            LongInt;}
        {group1SrcEntrySize:
            LongInt;}
        {group1SrcTypes:
            ARRAY [1..group1SrcCount]
    OF FileTypeSpec;}
        {group1DstCount:
            LongInt;}
        {group1DstEntrySize:
            LongInt;}
        {group1DstTypes:
            ARRAY [1..group1DstCount]
    OF FileTypeSpec;}
```

```
            (repeat above six lines for a total of
                groupCount times}
            END;
            FileTranslationListPtr
                = ^AFileTranslationList;
            FileTranslationListHandle
                =
            ^AFileTranslationListPtr;
```

A file translation list consists of a field indicating the modification date of the list and a count of the number of groups that follow those two fields. The size of the translation list that is prepared by an extension is variable, depending upon the number of groups, the file specification record size, and the number of file types that the extension knows about. PmodDate The creation date of the file translation list. If an extension uses external translators, this field is set to the modification date of a folder containing those translators.

groupCount The number of translation groups that follow.

group1SrcCount The number of file types in a group that the extension can read.

group1SrcEntrySize The size of the file specification records in the array that follows this field. In general, you can set this field to SizeOf (FileTypeSpec).

group1SrcTypes An array of file specification records. Include a file specification record in this array for each file type that your extension knows how to translate.

group1DstCount The number of file types in a group that the extension can write.

group1DstEntrySize The size of the file specification records in the array that follows this field. In general, you can set this field to SizeOf (FileTypeSpec).

group1DstTypes An array of file specification records. This file should include a file specification record in this array for each file type that an extension can be translated into.

Creating a Translation List

A translation extension must be able to inform Macintosh Easy Open of its translation capabilities when requested. To do this, define a DoGetFileTranslationList function in which a file translation list is filed as defined by a FileTranslationList record. The invention uses the file translation list returned to indicate which types of files an extension can translate into which other types. On the basis of this information, it may later call an extension to identify a particular document and possibly then also to translate it.

The FileTranslationList record has the following structure:

```
            TYPE FileTranslationList =
                RECORD
                    modDate:
                        LongInt;
                    groupCount:
                        LongInt;
                    {group1SrcCount:
                        LongInt;)
                    {group1SrcEntrySize:
                        LongInt;)
                {group1SrcTypes:
                        ARRAY [1..group1SrcCount]
                OF FileTypeSpec;}
                    {group1DstCount:
                        LongInt;}
                    {group1DstEntrySize:
                        LongInt;}
                    {group1DstTypes:
                        ARRAY [1..group1DstCount]
                OF FileTypeSpec;}
                    {repeat above six lines for a total of
                        groupCount times}
                    END;
```

This record contains a modification date and a count of the number of translation groups that follow. Each translation group in the file translation list specifies a collection of file types from which the extension can translate (the group1SrcTypes field) and a collection of file types into which the extension can translate (the group1DstTypes field). Within a translation group, an extension must be able to translate any of the source types into any of the destination types.

Different translation groups may correspond to different categories of applications within a group. For instance, you can place word processing applications in one group, spreadsheet applications in another, and so on. In most cases, group1SrcCount and group1DstCount will each be greater than 1, because most translators operate by translating through a particular data model. In these cases, it's also quite likely that the source and destination file types overlap or even coincide.

Within any particular group of file types, you specify a particular document format using a file type specification, defined by the FileTypeSpec data type.

```
            TYPE FileTypeSpec =
                RECORD
                    format:
                    FileType;
                    hint:
                    LongInt;
                    flags:
                    TranslationAttributes;
                    catInfoType:
                    OSType;
                    catInfoCreator:
                    OSType;
                END;
```

A file type specification includes the file type, a hint reserved for use by your extension, a flags field, and the original file type and creator. Because the list of file types that this extension can translate never changes, DoGetFileTranslationList fills out a file translation list the first time Macintosh Easy Open ever calls it; every other time it is called, DoGetFileTranslationList simply passes back the list it was just passed.

In most cases, a translation extension relies on external translators to perform the actual translation of files or scraps. If so, it's also likely that a user will be able to add and remove translators used by your extension—possibly by moving translators into or out of some specific folder. In that case, DoGetFileTranslationList function could read the modification date of that folder and compare with a value previously put in the modDate field to determine whether to regenerate the translation list.

Identifying Files

Once the invention knows the types of files from and to which an extension can translate, it can call an extension to determine whether the extension can translate a particular file. This further check is necessary because some documents might have file types that are not specific enough for translation purposes. For example, a document imported from a different operating system might have a file type of 'TEXT'. Another translation extension might be able to determine, however, that the file actually contains SurfWriterPC data and hence deserves special format conversion treatment. When a translation extension is called to identify a particular document, it should call your extension's DoIdentifyFile function.

Some documents can be identified simply by inspecting their file type and creator. Other documents (in particular, those of type 'TEXT') might require opening files and examining their contents to determine whether they can be translated by an extension. If an extension cannot recognize the document type, DoIdentifyFile would return noTypeErr. Otherwise, DoIdentifyFile would return noErr and the docKind parameter should be set to the recognized file type. The DoIdentifyFile function should not return 'TEXT' as a file type unless it's certain that the document consists of plain, unformatted ASCII text. It should be aware that even if an extension identifies a particular document as one that it can translate, The invention might not in fact call an extension to do the translation.

Translating Files

If a translation extension identifies a document as one that it can translate and the user chooses to use your translation extension, the extension is called to translate the document. The component selector dispatcher calls the DoTranslateFile function.

Translating A Document

By the time the DoTranslateFile routine is called, the file specified by the dstDoc parameter already exists. The destination file has a data fork; it also has a resource fork if the flags field in the appropriate destination file type specification has the taDstDocNeedsResourceFork bit set. The extension should open the destination file and fill it with the translated data.

Application Translation Extensions

An Application Translation Extension is a file that is put in the extension folder. Most applications can open only a certain number of file types and can therefore declare those openable file types by including an open resource in their resource forks. Some applications, however, need to determine dynamically which files they can open. This might be because those applications already contain data conversion capabilities using external filters. For these applications, the open resource alone is inadequate to specify which kinds of files they can open.

A preferable way to generate dynamically a list of application's openable file types is to provide an application translation extension, a translation extension that can create a list of file types and identify files, but which performs no actual translation. Essentially, the application translation extension exists solely to generate the dynamic list of file types an application can open. The source list in the file translation list that an extension returns to the invention should contain a file type specification for each of those types; for the destination list of types, the file translation list should contain a single file type specification whose format field contains some arbitrary and otherwise unused file type. Suppose this destination file type is 'VOID'.

The open resource in your application should then consist of a static list containing at least the value in the format field of the sole destination file type specification in the file translation list (that is, 'VOID'). The net effect, as far as the invention is concerned, is that an application can open documents of type 'VOID' and that a translation extension exists that can translate some other file types into type 'VOID'. As a result, that list of file types—which was generated dynamically—is now associated with an application.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A method in a computer system for processing a document created previously by an application program which is not currently accessible by the computer system, comprising the steps of:

determining that the application program that created the document is not accessible by the computer system;

identifying application programs that are accessible by the computer system that are different from the application program that created the document and are capable of translating the document;

calculating translation paths from the document to the accessible application programs;

selecting one of the accessible application programs capable of translating the document; and using the selected application program to translate the document into a format acceptable to an accessible application program.

2. The method according to claim 1, wherein following the step of using the selected program to translate the document, the method further comprises the step of launching the accessible application program.

3. The method according to claim 2, further comprising the step of opening the document.

4. The method according to claim 1, wherein following the step of identifying programs, the method further comprises the step of listing the accessible programs in order of fidelity.

5. The method according to claim 4, wherein the listing of programs includes an indicia indicating the preferred choice from among the programs based on fidelity.

6. The method according to claim 4, wherein the listing of programs includes an identification of translation paths.

7. The method according to claim 1, further comprising the step of identifying the file format of the document.

8. The method of claim 1 wherein the computer system is connected to a communications link, and further comprising the step of:

searching via the communications link for remotely located programs that are capable of translating the selected document.

9. The method of claim 1, further comprising the step of determining that a currently operating application program is incapable of translating the document.

10. An apparatus for processing a document created previously by an application program which is not accessible by a computer system, comprising:

means for determining that the application program that created the document is not accessible to the computer system;

means for identifying application programs that are accessible by the computer system that are different from the application program that created the document and are capable of translating the document;

means for calculating translation paths from the document to the accessible application programs;

means for selecting one of the accessible application programs capable of translating the document; and means for using the selected application program to translate the document into a format acceptable to an accessible application program.

11. The apparatus according to claim 10, further comprising means for launching the accessible application program.

12. The apparatus according to claim 10, further comprising means for identifying the file format of the document.

13. The apparatus according to claim 10, further comprising means for opening the document.

14. The apparatus according to claim 10, further comprising means for listing the programs in order of fidelity.

15. The apparatus of claim 10 wherein the computer system is connected to a communications link, and further comprising:

means for searching via the communications link for remotely located programs that are capable of translating the selected document.

16. A computer usable information storage medium storing computer readable program code means for causing a computer to perform the steps of:

displaying a list of document files for selection by a user of the computer;

detecting a user's selection eta listed document file;

determining that the application program that created the selected document file is not accessible by the computer system;

identifying application programs accessible by the computer system that are different from the application program that created the document and are capable of translating the document file;

calculating translation paths from the document to the accessible application programs;

selecting one of the accessible application programs capable of translating the document file; and using the selected program to translate the document file into a format acceptable to an accessible application program.

17. A method for computer system processing of a document file created previously, comprising the steps of:

using the computer to display a list of document files;

selecting a document file;

determining whether the application program that created the document file is currently accessible by the computer system, and if not then identifying application programs accessible by the computer system that are different from the application program that created the document and which are capable of translating the document file;

calculating translation paths from the document to the accessible application programs;

selecting from the identified application programs a application program capable of translating the document file; and using the selected application program to translate file document file.

18. The method of claim 17 further comprising after the step of translating the document file, the step of using the selected program to open the document file.

19. The method of claim 17 wherein the step of identifying programs comprises the step of listing the identified programs in order of fidelity of translation.

20. An apparatus for processing a document file created previously, comprising:

computer system memos for listing document files;

means for selecting a document file listed by the computer system means;

means for determining that the application program that created the document file is not accessible by the computer system means;

means for identifying application programs accessible by the computer system means that are different from the application program that created the document and that are capable of translating the document file;

means for calculating translation paths from the document to the accessible application programs;

means for selecting one of the identified application programs; and means for using the selected application program to translate the document file.

21. A computer usable information storage medium storing computer readable program code means for causing a computer to perform the steps of:

displaying a list of document flies for selection by a user of the computer;

detecting a user is selection of a listed document file;

determining that the application program that created the selected document file is not accessible by the computer;

identifying application programs accessible by the computer that are different from the application program that created the document and that are capable of translating the document file;

calculating translation paths from the document to the accessible application programs; and using the selected application program to translate the document file.

* * * * *